United States Patent [19]

Jäckel

[11] Patent Number: 5,194,046

[45] Date of Patent: Mar. 16, 1993

[54] DAMPER TYPE FLYWHEEL ASSEMBLY WITH AT LEAST ONE SUBSTANTIALLY SEGMENT-SHAPED MEMBER

[75] Inventor: Johann Jäckel, Baden-Baden, Fed. Rep. of Germany

[73] Assignee: Luk Lamellen und Kupplungsbau GmbH, Bühl, Fed. Rep. of Germany

[21] Appl. No.: 750,213

[22] Filed: Aug. 19, 1991

Related U.S. Application Data

[63] Continuation of Ser. No. 289,917, Dec. 23, 1988, abandoned.

[30] Foreign Application Priority Data

Jan. 29, 1988 [DE] Fed. Rep. of Germany ....... 3802581
Sep. 6, 1988 [DE] Fed. Rep. of Germany ....... 3830219

[51] Int. Cl.⁵ .......................... F16D 3/14; F16F 15/12
[52] U.S. Cl. ......................................... 464/67; 464/68
[58] Field of Search ....................... 74/574; 192/106.2; 464/66, 67, 68

[56] References Cited

U.S. PATENT DOCUMENTS

| | | | |
|---|---|---|---|
| 4,727,970 | 3/1988 | Reik et al. | 464/68 X |
| 4,747,801 | 5/1988 | Chasseguet et al. | 464/66 |
| 4,751,992 | 6/1988 | Maucher et al. | 192/103 A |
| 4,782,718 | 11/1988 | Hartig et al. | 464/66 X |
| 4,813,524 | 3/1989 | Reik | 464/66 X |

FOREIGN PATENT DOCUMENTS 3703123 9/1987 Fed. Rep. of Germany ........ 464/68
2163524 2/1986 United Kingdom ................... 464/68

OTHER PUBLICATIONS

"The Two-Mass Flywheel-A Torsional (Vibration Damper for the Power Train of Passenger Cars-State of the Art and Further Technical Development", SAE Technical Paper Series 870394, Sebulke, pp. 1-10, Feb. 1987.

Primary Examiner—Daniel P. Stodola
Attorney, Agent, or Firm—Peter K. Kontler

[57] ABSTRACT

A flywheel assembly has a first flywheel which is connectable to the output shaft of an internal combustion engine, and a coaxial second flywheel which is connectable with the input shaft of a variable-speed transmission in response to engagement of a friction clutch. The flywheels are rotatable relative to each other by deforming the coil springs of a first damper which substantially unassistedly offers a relatively small resistance to such rotation during an initial stage of angular movement of at least one flywheel in at least one direction from a neutral position relative to the other flywheel, and thereupon by deforming the coil springs of at least one second damper which offers a greater resistance to a further stage of angular movement of the at least one flywheel from the neutral position. The dampers compensate for fluctuations of torque which is transmitted between the engine and the transmission.

28 Claims, 3 Drawing Sheets 5,194,046

DAMPER TYPE FLYWHEEL ASSEMBLY WITH AT LEAST ONE SUBSTANTIALLY SEGMENT-SHAPED MEMBER

This application is a continuation, of application Ser. No. 07/289,917 filed Dec. 23, 1988, now abandoned.

BACKGROUND OF THE INVENTION

The invention relates to improvements in flywheel assemblies for use between the output shafts of combustion engines and the input shafts of variable-speed transmissions for motor vehicles. More particularly, the invention relates to improvements in flywheel assemblies of the type wherein a first flywheel can be connected with the engine, a second flywheel is connectable with the transmission (preferably in response to engagement of a friction clutch), and the flywheels can rotate relative to each other by overcoming the opposition of damper means which become active when the magnitude of transmitted torque fluctuates.

It is already known to equip flywheel assemblies of the above outlined character with damper means having a first damper which operates substantially unassistedly to offer a relatively small resistance to rotation of the flywheels relative to each other in at least one direction from starting or neutral positions, and a second damper which offers a greater resistance to a following stage of angular movement of the flywheels from such neutral positions. In heretofore known flywheel assemblies of the just outlined character, the energy storing elements (such as coil springs) of the first damper alternate with the energy storing elements (such as coil springs) of the second damper in the circumferential direction of the flywheels. Moreover, the energy storing elements of the first damper are disposed at the same radial distance from the axes of the flywheels as the energy storing elements of the second damper. This entails a reduction of the maximum extent of angular movability of the one and/or the other flywheel from the neutral position against the opposition of the energy storing elements of the second damper, i.e., of that damper which is designed to resist rotation of the flywheels relative to each other with a rather large force during the second stage of angular movement from neutral positions. On the other hand, it is often desirable to ensure that the two flywheels be capable of turning relative to each other through a rather large angle against the resistance of one or more relatively strong coil springs or other suitable energy storing elements.

OBJECTS OF THE INVENTION

An object of the invention is to provide a novel and improved flywheel assembly which is constructed and assembled in such a way that it ensures satisfactory filtration of fluctuations of torque between the engine and the transmission of a motor vehicle.

Another object of the invention is to provide a flywheel assembly which ensures satisfactory filtration of the aforediscussed fluctuations of torque not only when the engine is idling but also when the engine is under load.

A further object of the invention is to provide a relatively simple, compact and inexpensive flywheel assembly which can be utilized to accomplish the above outlined objects.

An additional object of the invention is to provide the flywheel assembly with novel and improved means for damping fluctuations of torque which is transmitted between the flywheels.

Still another object of the invention is to provide a novel and improved method of counteracting fluctuations of torque in the power train between the internal combustion engine and the variable-speed transmission of a motor vehicle.

A further object of the invention is to provide a novel and improved flywheel for use in the above outlined assembly.

Another object of the invention is to provide a motor vehicle which embodies the above outlined flywheel assembly.

A further object of the invention is to provide a flywheel assembly whose constituents can be assembled or taken apart in a simple and time-saving manner.

An additional object of the invention is to provide a flywheel assembly which can be mass-produced and assembled in a fully automatic way.

A further object of the invention is to provide a novel and improved combination of dampers which can be installed within the confines of one of the flywheels in a space-saving manner.

An additional object of the invention is to provide novel and improved means for ensuring adequate lubrication of component parts of the damper means and for simultaneously performing at least one additional important and desirable function, particularly of contributing to the damping action during angular displacement of the flywheels relative to each other.

SUMMARY OF THE INVENTION

The invention is embodied in a flywheel assembly for compensation of fluctuations of torque which is transmitted between an output member of an internal combustion engine and an input member of a transmission. The flywheel assembly comprises a first flywheel which is connectable with the output member of the engine, and a second flywheel which is connectable with the input member of the transmission. The flywheels are rotatable relative to each other in at least one direction to and from a neutral position, and the flywheel assembly further comprises a substantially flange-like member which is coupled with (e.g., riveted to) the second flywheel, a component which is rotatable relative to the flange-like member, and damper means which are operative to oppose rotation of the flywheels from the neutral position The damper means include a first damper which is designed to substantially unassistedly oppose a first stage of rotation of the flywheels from the neutral position with a first force, and at least one second damper which is designed to oppose a second stage of rotation of the flywheels from the neutral position with a force which is greater than the first force. The second stage follows the first stage, and the second damper comprises a plurality of energy storing elements which are borne by the first flywheel in the neutral position of the flywheels. At least one energy storing element of the second damper is flanked by the aforementioned component in the circumferential direction of the flywheels, and the first damper comprises energy storing means borne by the flange-like member and serving to store energy under the action of the aforementioned component.

The component can comprise at least one substantially segment-shaped member which is disposed substantially radially inwardly of the at least one energy storing element of the second damper. The at least one energy storing element of the second damper has end portions which are spaced apart from each other in the circumferential direction of the flywheels, and the segment-shaped member has radially disposed extensions which are adjacent the end portions of the at least one energy storing element. The segment-shaped member has at least one window for the energy storing means of the first damper. The flange-like member is also provided with at least one window for the energy storing means of the first damper, and the windows of the segment-shaped member and flange-like member can have identical or similar lengths in the circumferential direction of the flywheels.

The flywheel assembly preferably further comprises means for confining the flange-like member and the aforementioned component to substantially angular movement relative to each other in the circumferential direction of the flywheels, i.e., for preventing any, or any appreciable, movements of the flange-like member and the component relative to each other in the radial direction of the flywheels.

In accordance with a presently preferred embodiment, the aforementioned component comprises two substantially segment-shaped members which are disposed at opposite sides of the flange-like member, and distancing means (e.g., two or more rivets) which connect the segment-shaped members to each other. The distancing means preferably extend through one or more openings (e.g., in the form of elongated arcuate slots) in the flange-like member with limited freedom of movement of the flange-like member and segment-shaped members relative to each other in the circumferential direction of the flywheels. The distancing means can provide a rigid connection between the segment-shaped members and can abut the flange-like member under the action of centrifugal force in response to rotation of the flywheels.

The energy storing means of the first damper can comprise two energy storing elements which are disposed substantially diametrically opposite each other with reference to the axes of the flywheels. The energy storing elements of the second damper can include first and second energy storing elements each of which is disposed radially outwardly of an energy storing element of the first damper in the neutral position of the flywheels. The first and second energy storing elements of the second damper are preferably longer (as seen in the circumferential direction of the flywheels) than the energy storing elements of the first damper, and each energy storing element of the first damper can be disposed substantially midway between the ends of the radially outwardly adjacent energy storing element of the second damper, at least in the neutral position of the flywheels.

The second damper can include a first damping unit which serves to oppose a relatively long first portion of the aforementioned second stage of rotation of the flywheels relative to each other with a first second force which is greater than the first force, and a second damping unit which is designed to oppose a relatively short second portion of the second stage with a second second force which is greater than the first second force. The energy storing elements of the second damper can include two energy storing elements which form part of the first damping unit, and two energy storing elements forming part of the second damping unit. The energy storing elements of the first damper are, or can be, disposed radially inwardly of the energy storing elements of the first unit of the second damper. The energy storing elements of the second damper include first energy storing elements forming part of the first damping unit and second energy storing elements forming part of the second damping unit. The first energy storing elements preferably alternate with the second energy storing elements in the circumferential direction of the flywheels.

The first and second dampers can be connected in series.

The first flywheel can be provided with an annular compartment for the energy storing elements of the second damper, and the energy storing elements in the compartment are substantially equidistant from the axes of the flywheels. The radially innermost portion of the compartment can be substantially sealed by the flange-like member. The latter can include portions (e.g., radially outwardly extending arms) which are engageable with the energy storing elements in the compartment. The compartment can be defined by two substantially shell-shaped sections of first flywheel, and at least one of these sections can consist of profiled metallic sheet material. The aforementioned radially outwardly extending portions of the flange-like member preferably divide the compartment into arcuate portions and each such arcuate portion can receive an energy storing element of the second damper. The sections of the first flywheel can be provided with pocket-like stops for the energy storing elements of the second damper. The radially outwardly extending portions of the flange-like member can be staggered with reference to the stops in the circumferential direction of the flywheels. The radially outwardly extending portions of the flange-like member alternate with windows (e.g., in the form of recesses or cutouts provided in the radially outermost portion of the flange-like member) for the energy storing elements of the second damper; such windows are disposed radially outwardly of windows (in the flange-like member) for the energy storing elements of the first damper. First portions of energy storing elements of the second damper extend into the respective windows or recesses of the flange-like member, and additional portions of energy storing elements of the second damper extend into the respective arcuate portions of the compartment in the first flywheel. The windows in the flange-like member can be longer than the corresponding arcuate portions of the compartment. The windows of the flange-like member include first windows for the energy storing elements of the first unit of the second damper, and second windows which alternate with the first windows in the circumferential direction of the flywheels and receive portions of energy storing elements forming part of the second unit of the second damper. The second windows can be shorter (actually much shorter) than the first windows. The energy storing elements of the second damping unit can include coil springs having neighboring convolutions which can actually abut each other in response to a predetermined maximum permissible angular movement of the flywheels from their neutral position so that the coil springs then act as solid bodies which positively prevent any further rotation of the flywheels from the neutral position, i.e., the coil springs can limit the extent of angular movement of the flywheels relative to each other during the aforementioned second stage, and more specifically during the second portion of the second stage.

The compartment can form part of an annular chamber which is defined by the sections of the first flywheel and can receive a supply of viscous liquid. The supply of viscous liquid can be selected in such a way that the liquid fills only a portion of the chamber, particularly the annular compartment for the energy storing elements of the second damper.

The novel features which are considered as characteristic of the invention are set forth in particular in the appended claims. The improved flywheel assembly itself, however, both as to its construction and its mode of operation, together with additional features and advantages thereof, will be best understood upon perusal of the following detailed description of certain specific embodiments with reference to the accompanying drawing.

DESCRIPTION OF PREFERRED EMBODIMENTS

Figure 1:
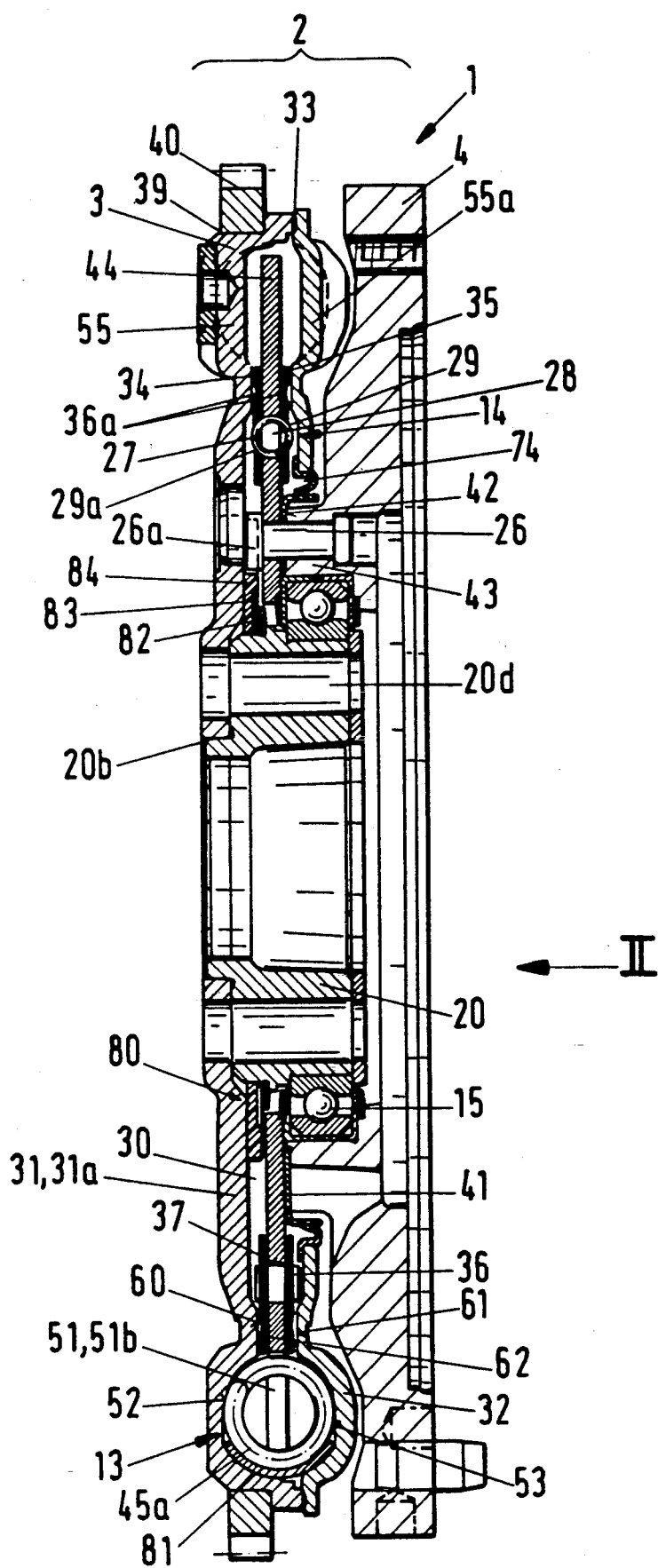
FIG. 1 is an axial sectional view of a flywheel assembly which embodies one form of the invention.
Figure 2:
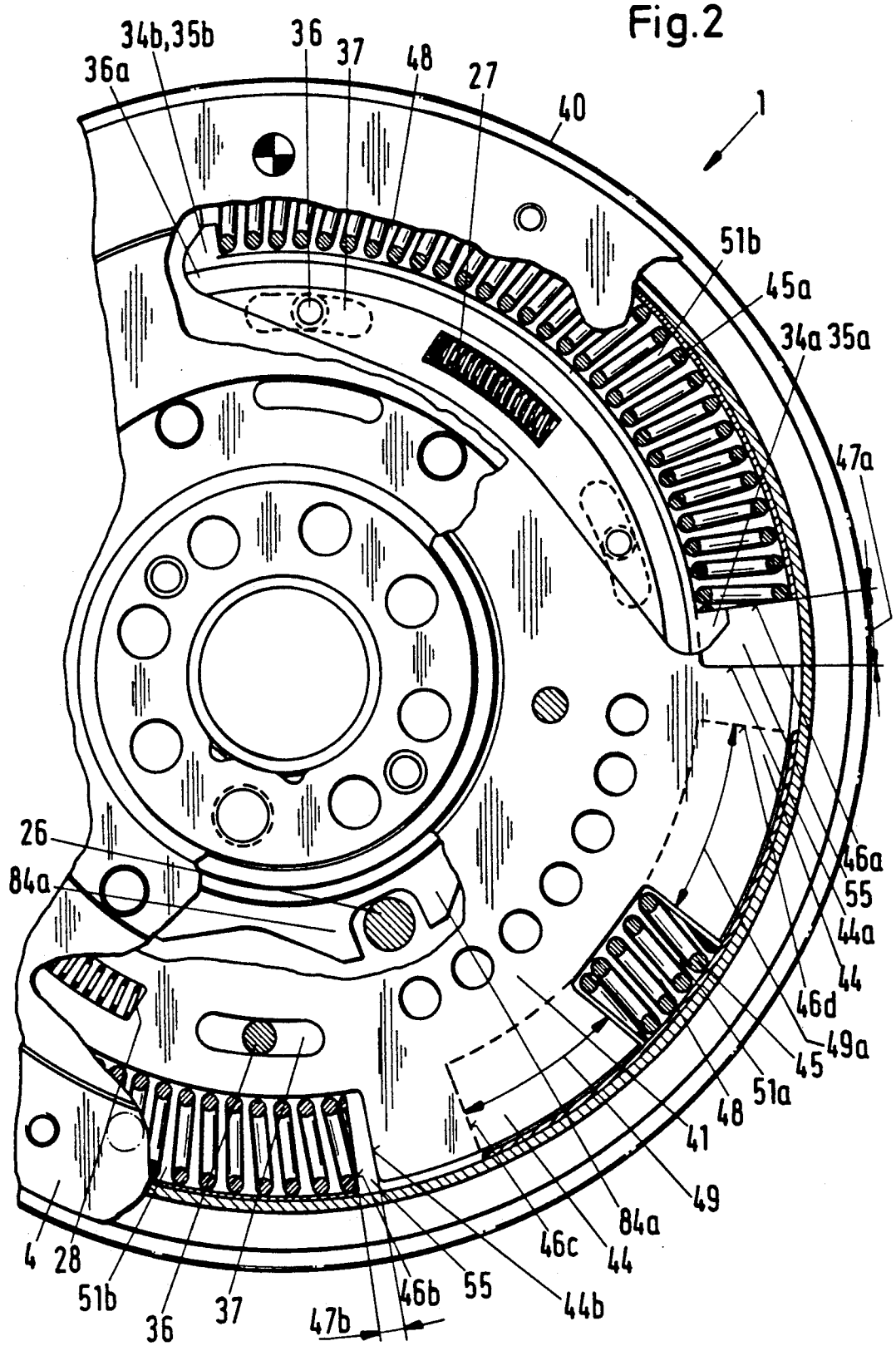
FIG. 2 is a fragmentary elevational view as seen in the direction of arrow II in FIG. 1, with portions of the second flywheel and certain other parts broken away.

FIGS. 1 and 2 show a first flywheel assembly 1 which can be used to transmit torque between the output shaft (e.g., a crankshaft) of an internal combustion engine and the input shaft of a variable-speed transmission in a motor vehicle and to compensate for fluctuations of torque which is transmitted by the engine. The flywheel assembly 1 comprises a composite flywheel 2 having a first rotary flywheel 3 which can be connected to the output shaft of a combustion engine by a set of bolts or the like, not shown, and a second rotary flywheel 4 which is coaxial with the flywheel 3 and can be connected to the input shaft of a variable-speed transmission, preferably through the medium of a friction clutch. Reference may be had to commonly owned U.S. Pat. No. 4,727,970 which shows an engine, bolts for connecting the first flywheel of a composite flywheel to the crankshaft of the engine, a variable-speed transmission, and a friction clutch which can be engaged to connect the second flywheel of the composite flywheel to the input shaft of the transmission. Reference may also be had to commonly owned published German patent application No. 37 03 123. The engine can transmit torque to the input shaft of the transmission in response to engagement of the friction clutch.

The flywheel assembly 1 further comprises a first damper 14 and at least one second damper 13. These dampers serve to oppose rotation of the flywheels 3, 4 relative from each other from a neutral or starting position which is shown in FIG. 2. A centrally located axial protuberance 20 of the flywheel 3 is surrounded by the inner race of an antifriction ball bearing 15. The outer race of this bearing is surrounded by an axial protuberance 43 of the second flywheel 4. The illustrated bearing 15 has a single annulus of spherical rolling elements; however, it is equally possible to employ an antifriction bearing with two or more rows of spherical and/or otherwise configured rolling elements (see commonly owned U.S. Pat. No. 4,751,992). This is disclosed in numerous pending U.S. and foreign patent applications, as well as in numerous U.S. and foreign patents, of the assignee of the present application.

The first flywheel 3 constitutes a housing with two substantially shell-shaped sections 31, 32 of profiled metallic sheet material The sections 31, 32 define an annular chamber 30 for the dampers 13 and 14. The radially outermost portions of the sections 31, 32 are directly connected to each other, e.g., by a welded bond (shown at 33) so that the radially outermost portion of the chamber 30 is sealed from the surrounding atmosphere. The bond 33 can be established by resistance butt welding the radially outermost portions of the sections 31, 32 to each other.

The output element of the damper 13 includes a flange-like member 41 (hereinafter called flange for short) which is disposed axially between the sections 31, 32 of the first flywheel 3. The radially innermost portion of the flange 41 is secured to the axial protuberance 43 of the second flywheel 4 by rivets 26 so that it abuts the end face 42 of the protuberance 43. The latter extends axially toward the section 31 of the flywheel 3.

The flange 41 comprises radially outwardly extending portions 44 in the form of arms which abut the end portions of adjacent energy storing elements 45, 45a of the damper 13. These energy storing elements are coil springs which extend in the circumferential direction of the flywheels 3 and 4.

The chamber 30 between the sections 31, 32 of the flywheel 3 includes an annular radially outermost portion 51 (hereinafter called compartment) which accommodates the springs 45, 45a of the damper 13. The compartment 51 is subdivided into discrete arcuate portions 51a, 51b which respectively receive the coil springs 45 and 45a. The length of the arcuate portions 51b greatly exceeds the length of the arcuate portions 51a (as seen in the circumferential direction of the flywheels 3 and 4). The major part of the compartment 51 is formed by annular grooves 52, 53 which are respectively provided in the inner sides of the sections 31, 32 and are disposed at opposite sides of the flange 41. The grooves 52, 53 are obtained as a result of deformation of blanks of metallic sheet material which are converted into the sections 31, 32 of the first flywheel 3. The radially outermost portion of the flange 41 is formed with recesses in the form of windows 48 which alternate with the arms 44 and include relatively short windows for the coil springs 45 and relatively long windows for the coil springs 45a. Each coil spring 45a extends into the respective longer window 48 as well as into the adjacent portions of the grooves 52, 53. Each coil spring 45 extends into the respective shorter window 48 as well as into the adjacent portions of the grooves 52, 53. Each arm 44 of the flange 41 is disposed between a longer coil spring 45a and a shorter coil spring 45 of the damper 13.

The configuration of surfaces bounding the grooves 52, 53 in the sections 31, 32 of the flywheel 3 is preferably such that these surfaces closely follow the outlines of the coil springs 45 and 45a. This ensures that, when the flywheels 3 and 4 are caused to rotate an elevated speed and the coil springs 45, 45a move radially outwardly under the action of centrifugal force, the radially outermost portions of helical convolutions of these springs can actually abut the adjacent portions of surfaces in the respective arcuate portions of the grooves 52 and 53.

However, and in order to reduce wear upon the sections 31, 32 of the flywheel 3 in response to expansion and contraction of the coil springs 45, 45a in the grooves 52, 53, the flywheel assembly 1 preferably further comprises an arcuate shroud 81 which can be made of a highly wear-resistant metallic or plastic material and is received in the radially outermost portion of the compartment 51 so that it is contacted by the convolutions of the coil springs 45, 45a when these springs tend to move radially outwardly under the action of centrifugal force. The shroud 81 can be made of hardened metallic material and can constitute a circumferentially complete annulus or can be assembled of several discrete arcuate sections each adjacent one of the coil springs 45 and 45a.

The end convolutions of the coil springs 45 and 45a are adjacent pairs of stops 55, 55a. The illustrated stops 55, 55a constitute integral pocket-like portions of the sections 31, 32 and are obtained as a result of suitable deformation of metallic blanks which are converted into the sections of the flywheel 3. The stops 55, 55a extend axially of the flywheels 3, 4 into the annular compartment 51 of the flywheel 3, i.e., into the radially outermost portion of the chamber 30.

FIG. 2 shows the flywheels 3 and 4 in their starting or neutral angular positions relative to each other. In such neutral positions of the 5 flywheels 3 and 4, the angular positions of arms 44 on the flange 41 and of the stops 55, 55a of the flywheel 3 relative to each other are such that the stops 55, 55a are angularly offset with reference to the adjacent arms 44. In other words, that portion of each stop 55, 55a which serves to engage and to deform the end convolution of the adjacent spring 45 or 45a is angularly offset relative to the respective arm 44 of the flange 41. At such time, the flywheel assembly 1 does not transmit any torque or transmits negligible torque and the coil springs 45a of the damper 13 are carried by the flange 41.

The damper 14 includes energy storing means composed of two coil springs 27 which are disposed radially inwardly of the coil springs 45, 45a of the damper 13 and are located substantially diametrically opposite each other with reference to the axes of the flywheels 3 and 4. Each coil spring 27 is disposed radially inwardly of a coil spring 45a and is installed substantially midway between the ends of the respective coil spring 45a (as considered in the circumferential direction of the flywheels 3, 4) in the neutral positions of the flywheels. The coil springs 27 are installed in elongated arcuate slot-shaped windows 28 of the flange 41. Furthermore, each coil spring 27 has portions extending into the adjacent windows 29, 29a of two arcuate segment-shaped members 35, 34 forming part of a component which further includes at least two distancing elements 36 in the form of rivets having shanks extending through elongated arcuate openings or slots 37 of the flange 41. The segment-shaped members 34, 35 are disposed at opposite sides of the flange 41 and have radially outwardly projecting portions or extension 34a, 34b and 35a, 35b which are adjacent the respective end convolutions of the corresponding coil spring 45a. The flywheel assembly 1 of FIGS. 1 and 2 comprises two components 34–36, one for each of the coil springs 45a. The shanks of the distancing elements 36 and the surfaces bounding the openings or slots 37 for such shanks constitute means for confining the components 34–36 and the flange 41 to movements relative to each other in the circumferential direction of the flywheels 3 and 4, i.e., the components 34–36 cannot move radially of the flywheels 3 and 4.

The rivet-shaped distancing elements 36 are designed to hold the respective segment-shaped members 34, 35 against any movement toward or away from each other (i.e., in the axial direction of the flywheels 3 and 4). Since the shanks of the distancing elements 36 are received in the respective openings or slots 37 with a minimal radial play, the segment-shaped members 34, 35 cannot change their positions (by moving radially outwardly) when the flywheels 3, 4 are rotated and the members 34, 35 are acted upon by centrifugal force. The mutual spacing of extensions 34a, 34b on the member 34 and of extensions 35a, 35b on the member 35 is such that these pairs of extensions receive between them the respective coil springs 45a with negligible clearance (in the circumferential direction of the flywheels 3 and 4) or with no clearance at all.

The flywheel assembly 1 of FIGS. 1 and 2 is designed in such a way that the length of the windows 28 for the coil springs 27 of the damper 14 matches the length of the corresponding windows 29, 29a in the segment-shaped members 35, 34 (as measured in the circumferential direction of the flywheels 3 and 4). This ensures that, when the flywheels 3 and 4 are idle, the coil springs 27 maintain the respective segment-shaped members 34, 35 in predetermined angular positions relative to the flange 41, i.e., each window 28 is then in full register with the adjacent windows 29 and 29a.

The length of the coil springs 27 (in unstressed condition of these springs) can exceed the length of the windows 28, 29 and 29; the coil springs 27 are then installed in prestressed condition.

The longer coil springs 45a of the damper 13 extend the full length of the respective arcuate portions 51b of the compartment 51, and the end convolutions of these coil springs abut the respective extensions 34a, 35a and 34b, 35b of the adjacent segment-shaped members 34, 35 so that the members 34, 35 are maintained in predetermined positions relative to the flywheel 3 when the composite flywheel 2 does not rotate. At the same time, the members 34, 35 maintain the flange 41 in a predetermined angular position relative to the flywheel 3. Since the flange 41 is coupled to the flywheel 4 by the rivets 26, the flywheels 3 and 4 are automatically maintained in the neutral positions of FIG. 2 when the engine does not drive the flywheel 3 or the transmission does not transmit torque to the flywheel 4. The coil springs 45a can be installed in the arcuate portions 51b of the compartment 51 in prestressed condition so that they act upon the extensions 45a, 45b of members 45 and upon the extension 35a, 35b of the members 35 as well as upon the stops 55, 55a with a predetermined force. The length of the windows 48 for the coil springs 45a can be much less than the length of the corresponding arcuate portions 51a of the compartment 51.

FIG. 2 shows that, when the flywheels 3, 4 are maintained in the neutral positions of FIG. 2, the edge faces 44a and 44b of the arms 44 are angularly offset with reference to the edge faces 46a and 46b of the stops 55, 55a in such a way that a relatively small clearance 47b develops between the edge faces 44b, 46b and a larger clearance 47a develops between the edge faces 44a, 46a. The clearance 47a is reduced when the flywheels 3, 4 rotate relative to each other in a first direction, and the clearance 47b is reduced when the flywheels 3, 4 rotate relative to each other in a second direction counter to the first direction. In other words, the flywheels 3, 4 can rotate relative to each other in the first direction (through a relatively large angle) before the coil springs 45a are caused to store energy (or to store additional energy if they are installed in prestressed condition), and the flywheels 3, 4 can rotate relative to each other in the second direction through a relatively small angle (between 44b, 46b in FIG. 2) before the springs 45a begin to store (additional) energy. The relatively small angular movement of the flywheels 3, 4 relative to each other (to eliminate the clearance 47b) will take place when the flywheel 3 rotates in a direction to drive the flywheel 4, 30 and the relatively large angle (clearance 47a) must be reduced to zero when the engine is coasting, i.e., when the flywheel 3 receives torque from the flywheel 4).

FIG. 2 further shows that the longer coil springs 45a of the damper 13 extend along arcs of approximately 90° so that these coil springs can permit the flange 41 and the flywheel 4 to cover a relatively large angle relative to the flywheel 3 or vice versa. The coil springs 45a undergo compression during a relatively long first portion of the second stage of operation of the damper means including the dampers 13, 14, and the much shorter coil springs 45 undergo compression during a shorter second portion of the second stage, the second portion following the first portion of the second stage of damping operation of the damper means 13, 14. Only the coil springs 27 of the damper 14 are caused to store energy during the first stage of damping action which precedes the second stage and is furnished practically exclusively (unassistedly) by the damper 14.

In the neutral positions of the flywheels 3, 4 (shown in FIG. 2), the edge faces of the arms 44 adjacent the windows 48 for the coil springs 45 are spaced apart from the edge faces 46c, 46d of the stops 55, 55a by relatively large distances 49 and 49a. This is necessary in order to ensure that the first portion of the second stage of damping action (by the damper 13 including the coil springs 45, 45a) is completed before the relatively short coil springs 45 begin to store energy (during the second portion of second stage of damping operation of the damper means 13, 14). In fact, the angular clearances between the end convolutions of the coil springs 45 and the edge faces 46c, 46d are even somewhat larger than those shown at 49 and 49a because (and as shown in FIG. 2) the coil springs 45 are received in the respective windows 48 of the flange 41 with a certain amount of play which must be eliminated while the flywheels 3, 4 turn relative to each other in a first direction in order to eliminate the clearance 49, or in a second direction to eliminate the clearance 49a.

In accordance with a presently preferred embodiment, the clearances 49 and 49a are selected in such a way that the coil springs 45 are caused to store energy only during a relatively small second portion (e.g., through an angle of 2-8°) of the second stage of damping operation which is carried out by the dampers 13, 14 when the flywheels 3 and 4 are caused to rotate relative to each other. Angular movement of the flywheels 3, 4 in either direction is terminated when the coil springs 45 are fully compressed, i.e., when the convolutions of these coil springs abut each other so that each coil spring 45 acts not unlike a rigid block which positively prevents any further angular movement of the flywheel 3 relative to the flywheel 4 and/or vice versa. Such design prolongs the useful life of the flywheel assembly 1. The so-called spring rate of coil springs 27 is less than that of the coil springs 45a, and the spring rate of the coil springs 45a is less than that of the coil springs 45. Thus, the flywheels 3, 4 encounter a rather small resistance to rotation relative to each other during the first stage of angular movement from the neutral positions of FIG. 2 (when such angular movement is opposed practically exclusively by the damper 14), the flywheels 3, 4 thereupon encounter a greater resistance to further angular movement relative to each other during the first or initial portion of the second stage (when such angular movement is resisted by the first damping unit of the damper 13, namely the damping unit including the coil springs 45a), and the flywheels 3, 4 encounter an even greater resistance to angular movement relative to each other during the second or last portion of the second stage (when such angular movement is resisted by the second damping unit of the damper 13, namely by the unit including the coil springs 45). The coil springs 27 resist angular movements of flywheels 3, 4 from the neutral positions of FIG. 2 without any assistance on the part of the coil springs 45, 45a while the flywheels 3, 4 turn relative to each other in a direction to eliminate the clearance 47a or 47b; the coil springs 45a resist angular movements of the flywheels 3, 4 relative to each other in a direction to eliminate the clearance 49 or 49a (without further compression of the springs 27), i.e., during the first stage of operation of the damper 13; and the coil springs 45 oppose further rotation of the flywheels 3, 4 relative to each other simultaneously with the coil springs 45a to terminate such rotation when their convolutions come in actual contact with one another, i.e., when the length of the coil springs 45 (in the circumferential direction of the flywheels 3, 4) is reduced to a minimum, namely to the n × m wherein n is the number of convolutions in a spring 45 and m is the diameter of a convolution.

The coil springs 27 of the damper 14 and the coil springs 45a of the damper 13 operate in series. The exact mode of operation of the damper 14 and of that unit of the damper 13 which includes the coil springs 45a will depend on the mode of installing the coil springs 45a in the neutral position of the assembly 1 including the flywheels 3 and 4. Thus, if the coil springs 45a are installed in unstressed condition or in a slightly stressed condition, these springs can undergo a certain amount of compression by the coil springs 27 of the damper 14 before the arms 44 of the flange 41 actually reach the end convolutions of the adjacent coil springs 45a. Thus, it is possible to select the operation of the damper means 13, 14 in such a way that only the coil springs 27 store energy during an initial stage of rotation of the flywheels 3, 4 from the neutral position of the assembly 1, and that such compression of coil springs 27 alone is followed by a damping operation during which the coil springs 27 operate in series (i.e., they are compressed jointly, with the coil springs 45a) prior to a relatively long further stage when only the coil springs 45a are caused to store energy. The just described mode of operation is desirable and advantageous if the manufacturer wishes to avoid pronounced steps in the characteristic torsion curve of the flywheel assembly 1.

FIG. 1 shows that the sections 31, 32 of the flywheel 3 include substantially flat washer-like portions 60, 61 which are spaced apart from each other in the axial direction of the flywheel assembly 1 and define an annular gap 62 for that portion of the flange 41 which is located radially inwardly of the compartment 51, i.e., radially inwardly of the arms 44. The width of the gap 62 (in the axial direction of the flywheels 3, 4) slightly exceeds the combined thickness of the respective portion of the flange 41 and of the adjacent portions of segment-shaped members 34, 35. The axial positions of flange 41 and segment-shaped members 34, 35 can be selected in such a way that a path or clearance remains between each member 34 in the washer-like portion 60 as well as between each member 35 and the washer-like portion 61.

Each of the segment-shaped members 34, 35 is provided with an arcuate corrugation 36a which bulges from the general plane of the respective segment-shaped member 34 or 35 in the axial direction of the flywheels 3 and 4. Each corrugation 36a preferably extends circumferentially of the flywheels 3, 4 all the way between the ends of the respective segment-shaped member 34 or 35. The corrugations 36a bulge toward the respective sides of the flange 41 to thus that the main portions of members 34, 35 are maintained at a predetermined distance from each other (as measured in the axial direction of the flywheels 3 and 4). The establishment of clearances between the major portions of the segment-shaped members 34, 35 and the respective sides of the flange 41 (as a result of the provision of corrugations 36a) is particularly desirable and advantageous if the chamber 30 is at least partially filled with a viscous liquid (such as oil or grease) which can act as a damping agent and/or as a lubricant for the coil springs 45, 45a and for other parts (such as arms 44 of the flange 41 and extensions 34a, 34b and 35a, 35b of the segment-shaped members 34 and 35) which project into the compartment 51, i.e., into the radially outermost portion of the chamber 30 in the flywheel 3. The establishment of some clearances between the washer-like portions 60, 61 of the sections 31, 32 and the parts 41, 34, 35 in the gap 62 reduces the likelihood of pronounced adherence of members 34, 35 to the flywheel 3 and/or excessive damping action as a result of shearing effect of the flange 41 and segment-shaped members 34, 35 upon the supply of viscous liquid which is confined in the compartment 51 and is caused to flow into or from the compartment in response to rotation of the members 34, 35 relative to the flange 41 and/or as a result of rotation of the flange 41 and flywheel 3 relative to each other, i.e., while the coil springs 45 and/or 45a undergo compression or are permitted to dissipate energy. Absence of pronounced damping action is often desirable or necessary during that stage of rotation of flywheels 3, 4 from the neutral positions when the relatively weak coil springs 27 of the damper 14 are caused to store energy. As a rule, relatively small damping hysteresis is desirable during such idling or preliminary damping stage.

The quantity of viscous liquid in the chamber 30 is preferably selected in such a way that the liquid at least partially fills at least the arcuate portions 51a, 51b of the compartment 51 when the flywheels 3 and 4 rotate, i.e., when the liquid is urged radially outwardly under the action of centrifugal force. It is presently preferred to select the supply of liquid in the chamber 30 in such a way that the arcuate portions 51a, 51b of the compartment 51 are filled with liquid when the flywheels 3 and 4 rotate.

In the embodiment which is shown in FIGS. 1 and 2, the axial protuberance 20 forms an integral or separable part of the section 31. If the protuberance 20 constitutes a separately produced part, it is preferably provided with a cylindrical centering portion 20b for the radially innermost portion of the section 31. The latter can be affixed to the protuberance 20 by bolts (not shown) which extend through axially parallel bores or holes 20d and also serve to connect the flywheel 3 to the crankshaft of the engine. As mentioned above, the protuberance 20 is surrounded by the inner race of the antifriction bearing 15, and the outer race of this bearing is received in the protuberance 43 of the flywheel 4.

The peripheral surface of the section 31 has a cylindrical portion 39 which is surrounded by a starter gear 40. The latter is or can be a press fit on the section 31. The thickness of the metallic sheet material of the section 31 exceeds the thickness of the metallic sheet material of the section 32.

An annular seal 74 is installed between the radially innermost portion of the section 32 of the flywheel 3 and the protuberance 43 of the flywheel 4 in order to prevent escape of confined viscous medium from the chamber 30.

Still further, the means for damping angular movements of the flywheels 3 and 4 relative to each other comprises a friction generating device 80 which is also confined in the chamber 30 of the flywheel 3. This friction generating device surrounds the protuberance 20 of the flywheel 3 and is installed axially between the antifriction bearing 15 and the radially inwardly extending portion 31a of the section 31. The illustrated friction generating device 80 comprises a resilient element in the form of a diaphragm spring 82 which reacts against a shoulder of the protuberance 20 and bears against a ring 83 so that the ring 83 urges a friction disc 84 against the adjacent side of the radially extending portion 31a of the section 3, i.e., against the flywheel 3. The friction disc 84 is made of a suitable plastic material and has radially outwardly extending portions in the form of prongs 84a (FIG. 2) which are disposed in pairs and flank with certain play the heads 26a of the adjacent distancing elements 26, i.e., the heads 26a and the respective pairs of prongs 84a have a certain freedom of movement relative to each other in the circumferential direction of the flywheels 3 and 4. The friction disc 84 can rotate relative to the flywheel 3 (i.e., relative to the radially extending portion 31a of the section 31) when one prong of each pair of prongs 84a already abuts the respective rivet head 26a and the flywheels 3, 4 continue to turn relative to each other. Such turning of the friction disc 84 relative to the flywheel 3 takes place while the coil springs 45a of the first damping unit of the damper 13 are caused to store energy.

Figure 3:
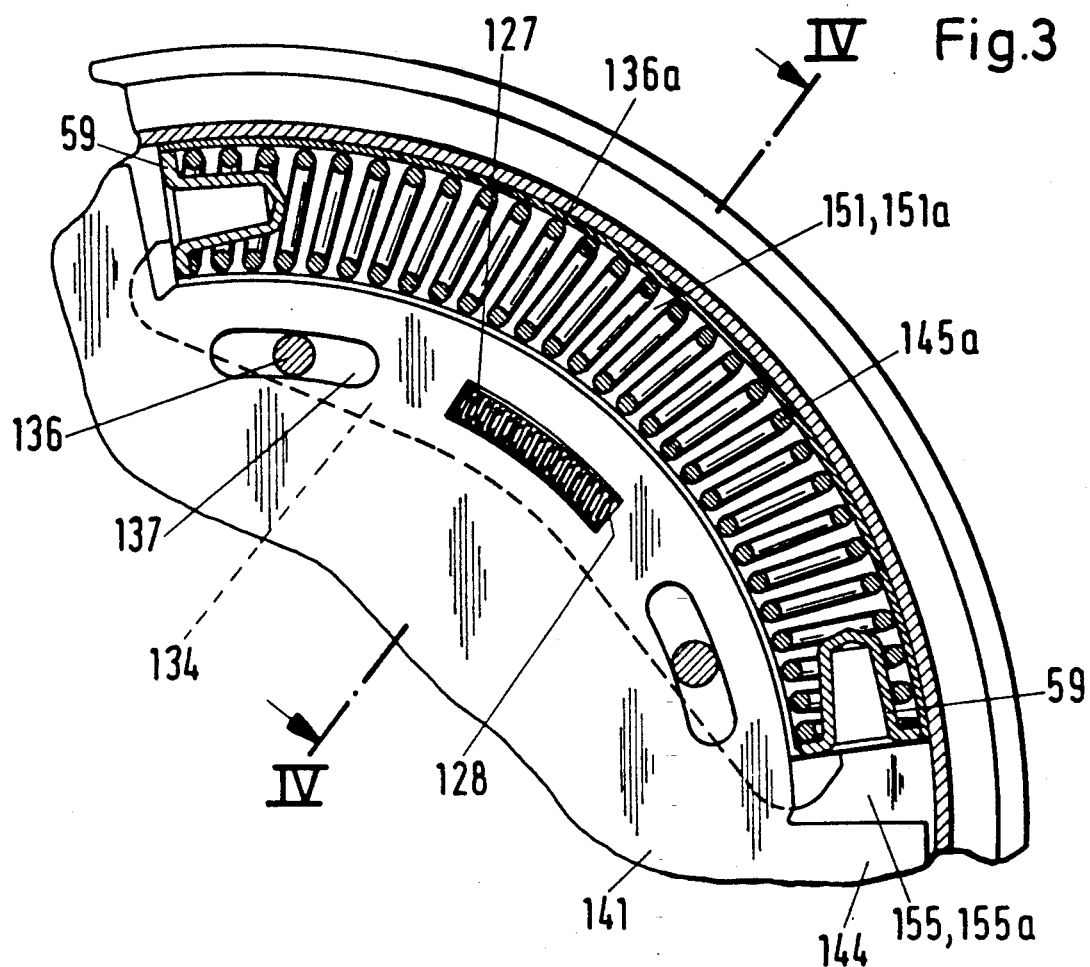
FIG. 3 is an elevational view of a portion of a modified flywheel assembly, with certain parts broken away.

The corrugations 36a of the segment-shaped members 34, 35 perform an additional desirable function, namely that of sealing the arcuate portions 51b of the compartment 51 of chamber 30 from the adjacent portions of the gap 62 between the washer-like portions 60, 61 of the sections 31, 32. This is particularly desirable and advantageous if the assembly of flywheels is further provided with cup-shaped motion transmitting members (inserts) between the arms 44 and the stops 55, 55a on the one hand, and the adjacent end convolutions of the coil springs 45a on the other hand. The configuration of such inserts (two inserts 59 are shown in FIG. 3) conforms to the surfaces bounding the adjacent parts of arcuate portions 51b of the compartment 51. The inserts then act not unlike pistons or plungers for the confined viscous medium when the flywheels 3 and 4 are caused to turn relative to each other.

Figure 4:
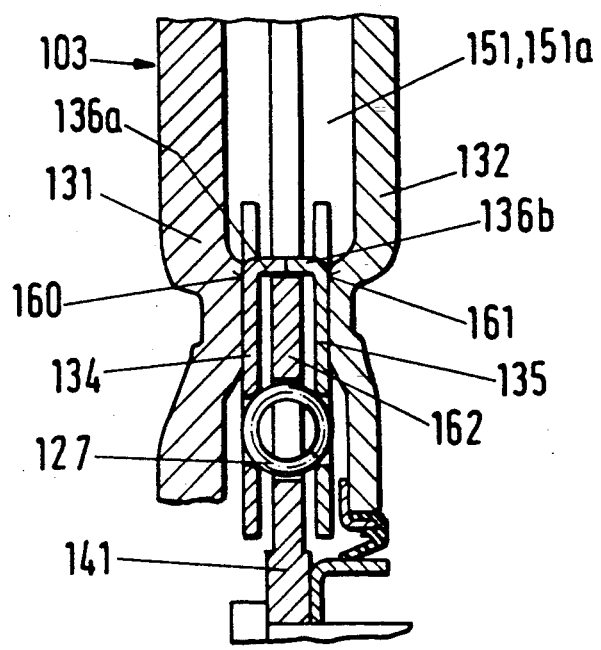
FIG. 4 is an enlarged fragmentary sectional view as seen in the direction of arrows from the line IV—IV of FIG. 3.

FIGS. 3 and 4 show a portion of a modified flywheel assembly wherein all such parts which are identical with or clearly analogous to the corresponding parts of the flywheel assembly 1 of FIGS. 1-2 are denoted by similar reference characters plus 100. As can be seen in FIG. 3, cup-shaped inserts or retainers 59 are disposed between the stops 155, 155a and the end convolutions of the adjacent coil springs 145a. The dimensions of the inserts 59 are selected in such a way that the peripheral surfaces of their flanges are immediately adjacent or abut the surfaces surrounding the respective arcuate portions 151a of the annular compartment 151 between the sections 131, 132 of the flywheel 103. Each arcuate portion 151a (only one can be seen in FIG. 3) receives one of the coil springs 145a.

The sections 131, 132 of the flywheel 103 have washer-like flat portions 160, 161 which are disposed radially inwardly of the compartment 151 and define a gap 162 for the flange 141 and segment-shaped members 134, 135. FIG. 4 shows that the width of the gap 162 exceeds the combined thickness of the flange 141 and segment-shaped members 134, 135 so that the gap 162 includes two unoccupied portions one of which is disposed between the flange 141 and the member 134 and the other of which is disposed between the flange 141 and the segment-shaped member 135. The segment-shaped members 134, 135 of each component are connected to each other by at least two rivet-shaped distancing elements 136 having shanks which extend through arcuate slot-shaped openings 137 of the flange 141. Such openings flank the respective coil spring 127 of the damper corresponding to the damper 14 of FIGS. 1-2. The members 134, 135 also comprise extensions which are adjacent the respective end convolutions of the respective coil spring 145a. Each coil spring 127 is received in a window 128 of the flange 141 and in windows of the respective segment-shaped members 134, 135. As can be seen in FIG. 3, the illustrated coil spring 127 is located midway between the end convolutions of the adjacent coil spring 145a in the neutral positions of the flywheels. The second coil spring 127 (not shown in FIGS. 3 and 4) is disposed diametrically opposite the illustrated coil spring 127 (with reference to the axes of the flywheels). The mode of operation of the damper including the coil springs 127 is or can be identical with or analogous to that of the damper 14 in the flywheel assembly 1 of FIGS. 1-2.

In order to enhance the damping action of viscous liquid in the annular compartment 151 of the chamber between the sections 131, 132 of the flywheel 103, at least during a portion of the maximum possible extent of angular movability of the flywheels 103 and 104 relative to each other, the radially innermost portion of each arcuate portion 151a of the compartment 151 is at least substantially sealed from the gap 162 between the washer-like portions 160, 161 of the sections 131, 132 by suitably configured radially outermost portions 136a, 136b of the segment-shaped members 134, 135. The portions 136a, 136b are mirror images of each other and extend axially of the flywheels toward each other at a location radially outwardly of the coil spring 145a in the respective arcuate portion 151a of the compartment 151. Their edge faces can actually abut each other and the outer sides of the members 134, 135 can actually abut the inner sides of the respective washer-like portions 160, 161 so that the radially innermost parts of arcuate portions 151a of the compartment 151 are at least substantially sealed from the gap 162. The curvature of arcuate portions 136a, 136b follows the curvature of the respective coil spring 145a. The flanges of the inserts or retainers 59 which are shown in FIG. 3 actually extend into the adjacent end portions of the U-shaped channel which is formed by the members 134, 135. The rivet-shaped distancing elements 136 for the members 134, 135 are preferably dimensioned in such a way that the major portions of members 134, 135 are permitted or actually compelled to abut the inner sides of the respective washer-like portions 160, 161 of the sections 131, 132. The intensity of hydraulic or viscous damping action of liquid medium which fills the compartment 151 (as a result of expulsion of the medium from the arcuate portions 151a) is a function of the quality of sealing action which is established between the compartment 151 and the gap 162 by the segment-shaped members 134, 135 and their axially extending arcuate portions 136a, 136b. The arrangement is preferably such that the flange 141 has freedom of axial movement relative to the segment-shaped members 134, 135. Therefore, the component including the members 134, 135 and the rivet-shaped distancing elements 136 has a certain freedom of axial movement relative to the flywheels, namely to the extent which is determined by the difference between the width of the gap 162 and the distance between the outer sides of the segment-shaped members 134, 135.

One or more inserts 59 can be provided with notches, grooves, holes, cutouts or other formations which permit the liquid to flow into and from the respective arcuate portions 151a of the compartment 151. This renders it possible to regulate the damping action of liquid medium which fills the compartment 151. Such damping action can also be regulated by selecting the play between the outer sides of segment-shaped members 134, 135 and the adjacent washer-like portions 160, 161 and/or by selecting the play with which the inserts 59 are received in the compartment 151. This damping action is part of the overall damping action, i.e., it must be added to the damping action of coil springs 145a while the springs 145a are caused to store energy. Thus, the designer of the flywheel assembly including the structure of FIGS. 3-4 can select one or more modes of influencing the damping action upon the flywheels while the flywheels turn relative to each other and the coil springs 145a undergo compression. This is desirable and advantageous because the damping action can be readily selected to remain within an optimum range.

The damping characteristic of damper means which oppose angular movements of the flywheels can also be influenced by shortening or lengthening the axially extending arcuate portions 136a, 136b of the segment-shaped members 134, 135 in such a way that these arcuate portions extend only along certain portions of or along the entire arcuate coil springs 145a (i.e., only along certain parts of or along the entire arcuate portions 151a of the compartment 151. For example, if the arcuate portions 136a, 136b are shortened so that they do not extend all the way to the end convolutions of the respective coil spring 145a, the hydraulic or viscous damping action is nil or hardly noticeable during the initial part of that portion of second stage of the damping action when the coil springs 145a are caused to store energy, and the hydraulic or viscous damping action becomes more pronounced or develops only after the inserts 59 have covered a distance toward each other which is necessary to introduce such inserts into the adjacent end portions of the U-shaped channel which is formed by the members 134, 135 and their axially extending arcuate portions 136a, 136b. The hydraulic damping action remains more pronounced while the flanges of the inserts 59 remain within the confines of the members 134, 135 and their arcuate portions 136a, 136b and as the inserts 59 move within the aforementioned channel and relative to each other.

The other springs (corresponding to the springs 45 in the flywheel assembly 1 of FIGS. 1-2) can also be provided with cup-shaped inserts or retainers of appropriate size and shape. This ensures that a hydraulic or viscous damping action can develop also during compression of the springs 45, i.e., subsequent to initial compression of the springs 145a. Such hydraulic damping action during compression of springs corresponding to the springs 45 of FIG. 2 can be enhanced by providing radially inwardly of such springs sealing or liquid flow obstructing devices each of which extends the full length of the respective spring (in the circumferential direction of the flywheels). The just discussed sealing or liquid flow obstructing devices can be mounted on the flange 141 in such a way that they are held against radial movement but can move axially of the flange. Each such sealing or flow obstructing device can extend axially substantially all the way between the washer-like portions 160, 161 of the sections 131, 132. If the just discussed sealing or flow obstructing devices are used in the flywheel assembly 1 of FIGS. 1-2, they can extend all the way between the portions 60, 61 of the sections 31, 32.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

What is claimed is:

1. A flywheel assembly for compensation of fluctuations of torque which is transmitted between an output member of a combustion engine and an input member of a transmission, comprising a first flywheel connectable with the output member of the engine; a second flywheel connectable with the input member of the transmission, said flywheels being rotatable relative to each other to and from a neutral position in at least one direction; a substantially flange-like member coupled with said second flywheel; a component rotatable relative to said flange-like member; and damper means operative to oppose rotation of said flywheels from said neutral position, said damper means including a first damper for substantially unassistedly opposing a first stage of rotation of said flywheels from said neutral position with a first force, and at least one second damper for opposing a second stage of rotation of said flywheels from said neutral position with a second force greater than said first force, said second stage following said first stage and said at least one second damper comprising a plurality of energy storing elements borne by said first flywheel in the neutral position of said flywheels, at least one of said energy storing elements being flanked by said component in the circumferential direction of said flywheels and said first damper comprising energy storing means borne by said flange-like member and arranged to store energy under the action of said component, said component comprising at least one substantially segment-shaped member disposed substantially radially inwardly of said at least one energy storing element, said at least one energy storing element having end portions spaced apart from each other in the circumferential direction of said flywheels and said segment-shaped member having radially disposed extensions adjacent the end portions of said at least one energy storing element.

2. The assembly of claim 1, wherein said at least one second damper includes a first damping unit arranged to oppose a first portion of the second stage of rotation of said flywheels from said neutral position and a second damping unit arranged to oppose a second portion of said second stage, said second portion following said first portion of said second stage and said energy storing elements including coil springs forming part of said second damping unit and having convolutions which abut each other to thus prevent further rotation of said flywheels relative to each other upon completion of second portion of said second stage.

3. The assembly of claim 1, wherein said segment-shaped member has at least one window for the energy storing means of said first damper.

4. The assembly of claim 3, wherein said flange-like member has a second window for the energy storing means of said first damper, said windows having identical or similar lengths in the circumferential direction of said flywheels.

5. The assembly of claim 1, further comprising means for confining said flange-like member and said component to substantially angular movement relative to each other in the circumferential direction of said flywheels.

6. The assembly of claim 1, wherein said component includes two substantially segment-shaped members, said flange-like member being disposed between said segment-shaped members and said component further comprising distancing means connecting said segment-shaped members to each other.

7. The assembly of claim 6, wherein said flange-like member has an opening and said distancing means extends through said opening with limited freedom of movement of said flange-like member and said segment-shaped members relative to each other in the circumferential direction of said flywheels.

8. The assembly of claim 7, wherein said distancing means provides a rigid connection between said segment-shaped members and abuts said flange-like member under the action of centrifugal force in response to rotation of said flywheels.

9. The assembly of claim 1, wherein the energy storing means of said first damper comprises two energy storing elements which are disposed substantially diametrically opposite each other with reference to the axes of said flywheels, said energy storing elements of said at least one second damper including first and second energy storing elements more distant from said axes than said energy storing elements of said first damper, at least one of said first and second energy storing elements of said at least one second damper including two elements longer in the circumferential direction of said flywheels than the energy storing elements of said first damper and each energy storing element of said first damper being disposed substantially midway between the ends of and being radially inwardly adjacent one of said two elements of said at least one second damper in the neutral positions of said flywheels.

10. The assembly of claim 1, wherein said at least one second damper includes a first damping unit arranged to oppose a relatively long first portion of said second stage of rotation of said flywheels relative to each other with a first second force greater than said first force, and a second damping unit arranged to oppose a relatively short second portion of said second stage with a second second force greater than said first second force.

11. The assembly of claim 10, wherein said energy storing elements of said second damper include two energy storing elements forming part of said first damping unit, said energy storing means of said first damper including two energy storing elements each disposed radially inwardly of an energy storing element of said first damping unit.

12. The assembly of claim 10, wherein said energy storing elements of said at least one second damper include first energy storing elements forming part of said first damping unit and second energy storing elements forming part of said second damping unit, said second energy storing elements alternating with said first energy storing elements in the circumferential direction of said flywheels.

13. The assembly of claim 1, wherein said first and second dampers are connected in series.

14. The assembly of claim 1, wherein said first flywheel has an annular compartment for the energy storing elements of said second damper, said energy storing elements being substantially equidistant from the axes of said flywheels and said compartment having a radially innermost portion which is substantially sealed by said flange-like member, said flange-like member having portions engageable with said energy storing elements.

15. The assembly of claim 14, wherein said portions of said flange-like member extend radially outwardly of the axes of said flywheels.

16. The assembly of claim 14, wherein said first flywheel has two substantially shell-shaped sections which define said compartment.

17. The assembly of claim 16, wherein at least one of said sections consists of profiled metallic sheet material.

18. The assembly of claim 14, wherein said portions of said flange-like member divide said compartment into arcuate portions, said energy storing elements being disposed in said arcuate portions of said compartment.

19. The assembly of claim 1, further comprising pocket-like stops for the energy storing elements of said at least one second damper.

20. The assembly of claim 1, further comprising stops for the energy storing elements of said at least one second damper, said flange-like member having portions engaging the energy storing elements of said at least one second damper and being staggered with reference to said stops in the circumferential direction of said flywheels, said first flywheel defining an annular compartment and said energy storing elements being disposed in said compartment.

21. The assembly of claim 1, wherein said flange-like member has radially outwardly projecting portions and first windows alternating with said portions in the circumferential direction of said flywheels, said energy storing elements being disposed in said windows and said flange-like member further having second windows disposed radially inwardly of said first windows, said energy storing means of said first damper having energy storing elements in said second windows.

22. The assembly of claim 1, wherein said first flywheel defines an annular compartment having arcuate portions for first portions of said energy storing elements, said flange-like member having windows for second portions of said energy storing elements, said windows and said arcuate portions extending in the circumferential direction of said flywheels and said windows being longer than the respective arcuate portions.

23. The assembly of claim 22, wherein said at least one second damper includes a first damping unit arranged to oppose a first portion of said second stage of rotation of said flywheels from said neutral position and a second damping unit arranged to oppose a second portion of said second stage, said energy storing elements including first energy storing elements forming part of said first damping unit and having first portions in said windows, and second energy storing elements forming part of said second damping unit.

24. The assembly of claim 23, wherein said flange-like member has second windows for said second energy storing elements, said second windows being shorter in the circumferential direction of said flywheels than the windows for said first energy storing elements.

25. The assembly of claim 1, wherein said first flywheel defines an annular chamber for said damper means and further comprising a supply of viscous liquid in said chamber.

26. The assembly of claim 25, wherein said viscous liquid fills only a portion of said chamber.

27. A flywheel assembly for compensation of fluctuations of torque which is transmitted between a combustion engine and an input member of a transmission, comprising a first flywheel connectable with the engine; a second flywheel connectable with the input member of the transmission, said flywheels being rotatable relative to each other to and from a neutral position in at least one direction; and resilient dampers operative to oppose rotation of said flywheels from said neutral position, said dampers including a first damper for substantially unassistedly opposing a first stage of rotation of said flywheels from said neutral position with a first force, and at least one second damper for opposing a second stage of rotation of said flywheels from said neutral position with a second force greater than said first force, said second stage following said first stage and said at least one second damper comprising at least one first energy storing element having first and second ends and at least one second energy storing element, said at least one first energy storing element being operative within the entire second stage and said at least one second energy storing element being operative in parallel with said at least one first energy storing element within a portion of said second stage, the energy storing elements of said at least one second damper being guided by one of said flywheels and being acted upon by a substantially disc-shaped first component which shares the angular movements of the other of said flywheels, said first damper comprising energy storing elements which are supported by said first component and are acted upon by a second component which is rotatable relative to said first component and relative to said flywheels and is acted upon by the first and second ends of the at least one first energy storing element of said at least one second damper.

28. The flywheel assembly of claim 27, wherein said at least one first energy storing element of said at least one second damper has a first spring rate and said at least one second energy storing element of said at least one second damper has a second spring rate which is greater than said first spring rate.

* * * * *